US012119199B2

(12) United States Patent
Zhao et al.

(10) Patent No.: US 12,119,199 B2
(45) Date of Patent: Oct. 15, 2024

(54) POWER DEVICE AND FABRICATION METHOD THEREOF

(71) Applicant: INSTITUTE OF MICROELECTRONICS OF THE CHINESE ACADEMY OF SCIENCES, Beijing (CN)

(72) Inventors: Fazhan Zhao, Beijing (CN); Jianhui Bu, Beijing (CN); Jiajun Luo, Beijing (CN)

(73) Assignee: INSTITUTE OF MICROELECTRONICS OF THE CHINESE ACADEMY OF SCIENCES, Beijing (CN)

( * ) Notice: Subject to any disclaimer, the term of this patent is extended or adjusted under 35 U.S.C. 154(b) by 234 days.

(21) Appl. No.: 17/595,770

(22) PCT Filed: Jan. 20, 2021

(86) PCT No.: PCT/CN2021/072889
§ 371 (c)(1),
(2) Date: Nov. 23, 2021

(87) PCT Pub. No.: WO2021/208553
PCT Pub. Date: Oct. 21, 2021

(65) Prior Publication Data

US 2022/0328275 A1 Oct. 13, 2022

(30) Foreign Application Priority Data

Apr. 13, 2020 (CN) ......................... 202010287813.9
Apr. 13, 2020 (CN) ......................... 202020537935.4

(51) Int. Cl.
*H01J 19/24* (2006.01)

(52) U.S. Cl.
CPC .................................... *H01J 19/24* (2013.01)

(58) Field of Classification Search
CPC ......... G03F 7/70008; H01J 1/304; H01J 1/34; H01J 37/073; H01J 35/065; H01J 2201/30411; H01J 2201/3048; H01J 2237/0635; H01J 1/3048; H01J 1/3044; H01J 9/025
See application file for complete search history.

(56) References Cited

U.S. PATENT DOCUMENTS 5,124,664 A * 6/1992 Cade ....................... H01J 25/10 330/45
2017/0047207 A1* 2/2017 Chuang ............... G03F 7/70008

* cited by examiner

*Primary Examiner* — Elmito Breval
(74) *Attorney, Agent, or Firm* — Platinum Intellectual Property

(57) ABSTRACT

The present disclosure discloses a power device including at least one vacuum packaged unit structure. The unit structure comprises a silicon substrate (100) and an emitter (200), a light modulator (300) and a collector (400) formed on the silicon substrate (100). On the one hand, the unified silicon-based process is compatible with the existing commercial process, so that it is easy for integration, simple for manufacture, and low in cost; on the other hand, the light modulator (300) is introduced and formed on the silicon substrate by a silicon-based process, which enhances field emission efficiency of the emitter (200), offsets the inconsistency of distances between the tips of the emitters (200) and the collector (400) caused by unevenness of the emitters, and increases the process redundancy of the cold cathode emitter.

13 Claims, 3 Drawing Sheets

POWER DEVICE AND FABRICATION METHOD THEREOF

CROSS-REFERENCE OF RELATED APPLICATIONS

This application is a United States National Stage Application filed under 35 U.S.C 371 of PCT Patent Application Serial No. PCT/CN2021/072889, filed Jan. 20, 2021, which claims priority of China patent applications No. 202010287813.9 and No. 202020537935.4 filed with China Patent Office on Apr. 13, 2020, all contents of which are hereby incorporated by reference.

TECHNICAL FIELD

The present disclosure relates to the field of vacuum microelectronics, and more particularly to a power device and a fabrication method thereof.

BACKGROUND OF THE INVENTION

A withstand voltage of an existing power device is borne by the space electric field of a semiconductor junction (e.g., PN junction), which limits an on-resistance and working efficiency of the device. Although an existing vacuum microelectronic power device with a field cathode emission is a power device, which improves its capability to withstand voltage, and its power and reliability can not be guaranteed, because its electron emission completely relies on an electric field emission, so that the product is not mature.

SUMMARY OF THE INVENTION

In order to solve the deficiencies of the prior art, the present disclosure provides a power device with high reliability and a fabrication method thereof.

In one aspect, the present disclosure provides a power device comprising at least one vacuum packaged unit structure; wherein the unit structure comprises: a silicon substrate; an emitter formed on the silicon substrate by a silicon-based process; a light modulator formed on the silicon substrate by a silicon-based process, the light modulator being configured to generate photons to excite the emitter to emit electrons; a collector formed on the silicon substrate by a silicon-based process, the collector being configure to receive the electrons emitted by the emitter.

According to some embodiments, the unit structure further comprises a gate formed on the silicon substrate by a silicon-based process, the gate being configured to generate an electric field to excite the emitter to emit electrons.

According to some embodiments, the light modulator is a LED structure emitting light transversely.

According to some embodiments, the light modulator is an ultraviolet LED.

According to some embodiments, the ultraviolet LED comprises an N-type semiconductor material, a P-type semiconductor material, and a resonant cavity formed by the N-type semiconductor material and the P-type semiconductor material.

According to some embodiments, the N-type semiconductor material and the P-type semiconductor material are gallium nitride, indium gallium nitride or aluminum gallium nitride.

According to some embodiments, the emitter comprises a silicon-based microtip structure and a metal layer covering the silicon-based microtip structure.

According to some embodiments, the pressure of the vacuum package is $10^{-6}$ Pa~10 Pa.

According to some embodiments, the power device comprises at least two of the unit structures, and the two unit structures are integrated in a mirror-image form along the light modulator.

According to some embodiments, a bonding cover is further formed on the two unit structures integrated in a mirror-image form along the light modulator.

In another aspect, the present disclosure also provides a method of fabricating a power device, by which the above-described unit structure is fabricated; the method comprises: fabricating a silicon substrate; fabricating a light modulator on the silicon substrate by an epitaxial process, wherein a negative electrode of the light modulator is connected to the silicon substrate and a positive electrode of the light modulator is led out as a control electrode for light modulation; fabricating an emitter on the silicon substrate next to the light modulator; and combining a pre-fabricated collector with the silicon substrate by a silicon bonding process to form a unit structure.

One or more technical solutions provided in the embodiments of the present application have at least the following technical effects or advantages:

The vacuum packaged unit structure of the power device comprises a silicon substrate; an emitter formed on the silicon substrate by a silicon-based process; a light modulator formed on the silicon substrate by a silicon-based process, the light modulator being configured to generate photons to excite the emitter to emit electrons; a collector formed the silicon substrate by a silicon-based process, the collector being configure to receive the electrons emitted by the emitter. On the one hand, the unified silicon-based process is compatible with the existing commercial process, so that it is easy for integration, simple for manufacture, and low in cost; on the other hand, the light modulator is introduced and formed on the silicon substrate by the silicon-based process, which enhances field emission efficiency of the emitter, offsets the inconsistency of distances between the tips of the emitters and the collector caused by unevenness of the emitters, and increases the process redundancy of the cold cathode emitter, so that the device does not need to completely rely on the field emission principle to generate electrons, field emission loads are reduced and the reliability of the device is further enhanced.

BRIEF DESCRIPTION OF THE DRAWINGS

In order to more clearly illustrate the technical solution in the embodiments of the present disclosure, the drawings to be used in the description of the embodiments will be briefly introduced in the following. Apparently, the drawings in the following description involve some embodiments of the present disclosure. For those of ordinary skill in the art, other drawings can be obtained based on these drawings without paying creative labor.

LIST OF REFERENCE NUMERALS

Figure 1:
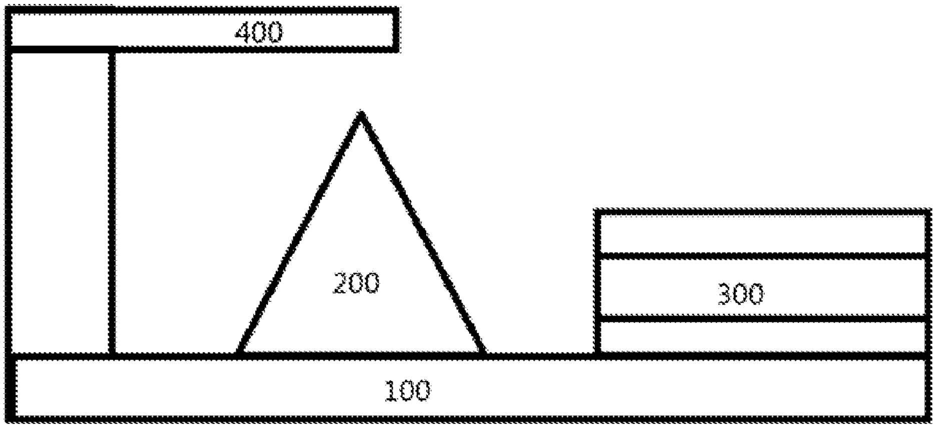
FIG. 1 is a schematic structural diagram of a unit structure of a power device according to an embodiment of the present disclosure.

100, silicon substrate; 200, emitter; 210, silicon-based microtip structure; 220, metal layer; 300, light modulator; 400, collector; 500, gate; 600, bonding cover.

DETAILED DESCRIPTION OF THE INVENTION

The present disclosure provides a power device and a fabrication method thereof, solving the technical problem of low reliability of the existing power devices.

To solve the above technical problem, the general concept of the embodiments of the present application is as follows. A power device is provided comprising at least one vacuum packaged unit structure. The unit structure includes: a silicon substrate 100; an emitter 200 formed on the silicon substrate 100 by a silicon-based process; a light modulator 300 formed on the silicon substrate 100 by a silicon-based process to generate photons so as to excite the emitter 200 to emit electrons; a collector 400 formed on the silicon substrate 100 by a silicon-based process, the collector 400 is configured to receive electrons emitted by the emitter 200.

On the one hand, the unified silicon-based process is compatible with the existing commercial process, so that it is easy for integration, simple for manufacture, and low in cost; on the other hand, the light modulator 300 is introduced and formed on the silicon substrate 100 by the silicon-based process, which enhances field emission efficiency of the emitter 200, offsets the inconsistency of distances between the tips of the emitters 200 and the collector 400 caused by unevenness of the emitters, and increases the process redundancy of the cold cathode emitter, so that the device does not need to completely rely on the field emission principle to generate electrons, thus the loads of the field emission are reduced and the reliability of the device is further enhanced.

In order to better understand the above technical solution, drawings and specific embodiments will be used to describe the above technical solution in detail.

Firstly it should be noted that the expression "and/or" in this application is merely for describing an association relationship of associated objects, indicating that there may be three relationships. For example, A and/or B can represent three situations: A alone, both A and B, and B alone. In addition, the symbol "/" in this application generally indicates that the associated objects before and after the symbol "/" have an "or" relationship.

In addition, the "inner" and "outside" appearing in the application have common meaning and are used for the convenience of clear description rather than limiting anything.

As known by analyzing the prior art, a conventional power device relies on PN to bear a voltage bias, and a large voltage bias requires a large drift region to bear, which results in an increase in turn-on resistance and thus affects the power efficiency of the device. Therefore, an attempt is made to increase the withstand voltage of a power device by way of a cathode field emission principle. However, the cathode field emission array cannot achieve a unified field emission threshold due to inconsistency in a process during fabrication, which in turn affects power promotion of the entire device and long-term work reliability of the entire device. Therefore, an attempt is made to increase the field emission efficiency by way of a light modulation principle so as to increase the field emission threshold margin, but the existing light modulation methods introduce an external light source by using a fiber, a carbon nanotube, etc., which greatly affects its integration and modulation. Thus, there is no possibility for mass production.

As shown in FIG. 1, according to some embodiments of the present disclosure, a power device is provided comprising at least one vacuum packaged unit structure, wherein the unit structure comprises: a silicon substrate 100; an emitter 200 formed on the silicon substrate 100 by a silicon-based process; a light modulator 300 formed on the silicon substrate 100 by a silicon-based process, and the light modulator 300 is used to generate photons to excite the emitter 200 to emit electrons; a collector 400 formed on the silicon substrate 100 by a silicon-based process, and the collector 400 is used to receive the electrons emitted by the emitter 200.

It is to be noted that a power device according to the present embodiment generally includes a plurality of unit structures integrated together, and the internal structure of a single unit structure is described here.

Referring to FIG. 1, the silicon substrate 100 is located at the bottom. The emitter 200, the collector 400, and the light modulator 300 are all formed on the silicon substrate 100 by silicon-based processes. On the one hand, the unified silicon-based process is compatible with existing commercial process, so that it is easy for integration, simple for manufacture, and low in cost. On the other hand, during working, the emitter 200 is excited to emit electrons by the electric field effect between the emitter 200 and the collector 400, and the collector 400 receives electrons. At the same time, the light modulator 300 excites the emitter 200 to emit electrons by a photoelectric effect, which supplements the electric field effect such that the device does not need to completely rely on the field emission principle to generate electrons, thereby the process redundancy of the cold cathode emitter is enhanced, the load of the field emission is reduced, and the reliability of the device is enhanced. In addition, since the light modulator 300 applies light modulation, it results in an increase in a modulation frequency, by which a high frequency response, or even high-frequency high power response can be achieved.

Furthermore, the supplement effect of the photoelectric effect of the light modulator 300 to the field emission can also increase the margin of the field emission threshold, so that the field emission array can still work normally with the aid of light although there are inconsistent emission thresholds, which facilitates the integration of array of the unit structures, thereby the power of the device and the reliability during a long-term work of the device are enhanced. Further, since the light modulator 300 is formed on the silicon substrate 100 by a silicon-based process and is self-illuminating, no external fiber or carbon nanotube is needed to be used for introduce of an external light source, so that the necessary condition for large scale integration is satisfied.

Figure 2:
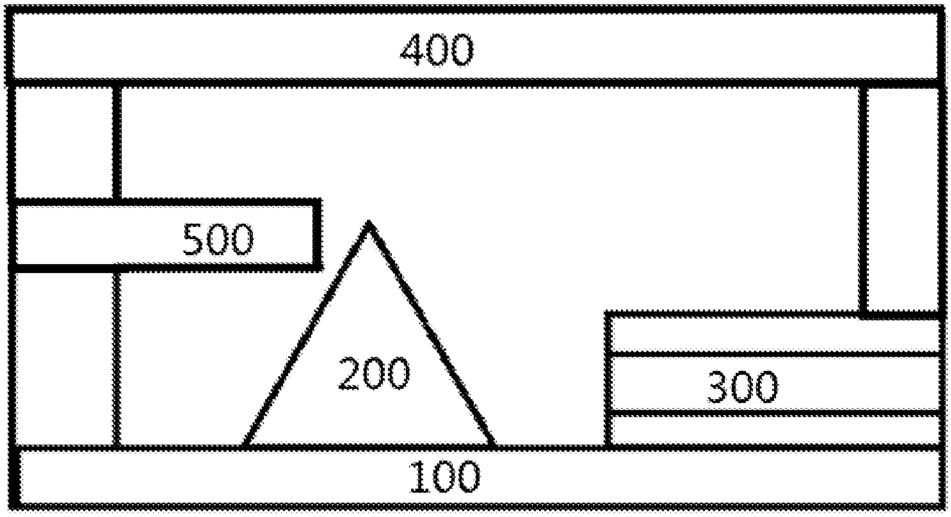
FIG. 2 is a schematic structural diagram of another unit structure of a power device according to an embodiment of the present disclosure.

As an alternative structure, see FIG. 2, the unit structure further comprises: a gate 500 formed on the silicon substrate 100 by using a silicon-based process, which is used to generate an electric field to excite the emitter 200 to emit electrons.

In this structure, the gate 500 is located between the collector 400 and the emitter 200 for generating an electric field to excite the emitter 200 to emit electrons, and the collector 400 is used to receive electrons. An advantage of adding the gate 500 is to improve the field emission modulation efficiency. In addition to generating the field emission electric field by the collector 400, the device uses the gate 500 that is closer to the emitter to increase a modulation electric field, by which an electric modulator can be realized, which is complementary to the light modulator. In addition, through controls of the two modulation terminals, the reliability of the device can be enhanced, so that control parameters of the two modulation terminals do not need to be set as extreme values.

It should be noted that when there is a gate 500, the photoelectric effect is applied for compensating the inconsistency in distances between the tips of the emitters 200 and the gate 500.

In this embodiment, the vacuum-packaging pressure is $10^{-6}$ Pa to 10 Pa. This range is set for the reason below. For the device, the electron needs to travel a certain distance from the emitter 200 to the collector 400. If there is full of air through this distance, the electron will collide with the gas atom in the air, which in turn will affect the electron to reach the collector 400. Therefore, the necessary conditions of vacuum are the requirements of the normal operation of the device. In addition, according to different manufacture processes, there are different distances between the gate 500 and the emitters 200, or between the collector 400 and the emitters 200. In order to obtain a field emission electric field, the applied field emission voltage is proportional to the emission distance and inversely proportional to the pressure of a vacuum cavity, so that the pressure is limited in a range, for which the lower pressure limit is generally determined by a process capability and the higher pressure limit is determined by the reliability of the device. When the field emission voltage is less than 30V and the emission efficiency is 1%, the pressure can be up to 10 Pa at most.

The overall structure of the unit structure has been introduced above, and in the following, the specific structures of the light modulator 300 and the emitter 200 will be described.

Referring to FIGS. 1 and 2, in the present embodiment, the light modulator 300 is a LED structure emitting light transversely, which is convenient to transmit photons to the emitter 200 located on a side thereof. The type of the light source can be selected as needed, as long as it can produce photoelectric effect and excite the emitter to emit electrodes. For example, light emitting LEDs with different wavelengths can be fabricated depending on different metal types (work functions) of the emitters 200. As an example, the light modulator 300 is an ultraviolet LED. The shorter wavelength of ultraviolet light can produce photoelectric effect more effectively. Specifically, the ultraviolet LED includes an n-type semiconductor material, a p-type semiconductor material, and a resonant cavity formed by the n-type semiconductor material and the P-type semiconductor material. The semiconductor material for the light modulator can be selected as needed, such as an InGaN/AlGaN structure. As an example, the n-type semiconductor material, and the P-type semiconductor material may be gallium nitride, indium gallium nitride, aluminum allium nitride. The reason for choosing gallium nitride, indium gallium nitride, and aluminum gallium nitride is that a wide band gap is conducive to generating ultraviolet light with short wavelength, and a direct band gap is conducive to achieving high light emission efficiency, and also, a silicon-based gallium nitride LED structure and process are very mature.

In an actual implementation process, an electrode can be led out from the ultraviolet LED to perform light intensity control by voltage thereon so as to supplement the efficiency of the field emission.

Figure 3:
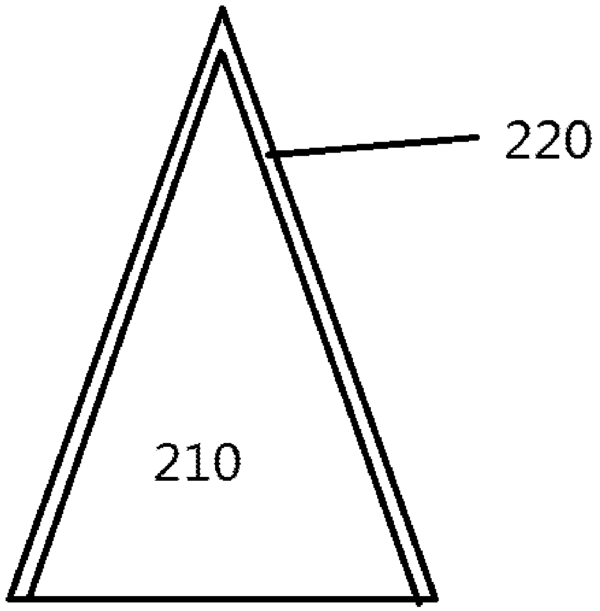
FIG. 3 is a schematic structural diagram of an emitter of FIG. 1.

Referring to FIG. 3, in the present embodiment, the emitter 200 includes a silicon-based microtip structure 210 and a metal layer 220 covering the silicon-based microtip structure 210. The metal layer 220 can be selected as needed, such as molybdenum. The metal layer 220 is attached to the silicon-based microtip structure 210 or is directly etched from a metal layer.

It is to be noted that in the present embodiment, a silicon-based process is a standard fabrication process with a silicon wafer as a substrate. In the specific implementation, the unit structure according to the present embodiment can be made by the following method steps:

1. fabricating a light-emitting diode by epitaxial-growing gallium nitride material on the silicon substrate 100, and a negative electrode of the light emitting diode is connected to the substrate, and a positive electrode is led out as a control electrode for light modulation of the power device;

2. fabricating a molybdenum tip emitter next to the light emitting diode by the Spindt process, or fabricating a silicon tip emitter 200 by the oxidation-sharpening process, and the emitter 200 is connected to the silicon substrate 100 to form the emission structure of the device together with the silicon substrate 100;

3. evaporating metal to form a collector 400 on another silicon substrate;

4. combining the collector 400 with other pre-fabricated components in a vacuum environment by a silicon bonding process, and providing a bonding cover 600 for remaining the vacuum environment; wherein the metal of the collector 400 faces other components when bonding. Alternatively, the collector 400 may also be formed by bonding a silicon wafer which is not evaporated with metal;

5. the respective electrodes are led out by a silicon-based process for subsequent packaging.

The specific structure of a unit structure has been introduced above, and in the following, the operation principle of the unit structure will be described.

FIGS. 1 and 2 are two kinds of unit structures of a power device. FIG. 1 is a simplification of the structure of FIG. 2. In FIG. 1, there is only a light modulation provided by the light modulator 300, and the field emission electric field is provided by the collector 400. The electric field provided by the collector 400 satisfies the smallest condition of field emission electric field in the device structure array, i.e., providing a basic electric field; then, the device uses the light field provided by the light modulator 300 to assist electron excitation of the emitter, and the excited electrons are received by the collector 400. The amount of the electrons received is modulated and controlled by the light modulator 300. The device of FIG. 2 is modulated through light modulation provided by the light modulator 300 and electric field modulation provided by the gate 500. Therefore, the voltage of the collector 400 in FIG. 2 can be appropriately reduced according to working requirements because it is not necessary to provide a field emission electric field, or a higher collection voltage can be achieved by increasing the distance from the collector 400 to the emitter 200. In addition, through controls of two modulation terminals, the reliability of the device can be enhanced, so that neither of control parameters of the two modulation terminals needs to be set as extreme values. The silicon substrate 100 and the emitter 200 are interconnected structures as the emitter (cathode) of the device, and a negative electrode of the light modulator 300 is connected to the structures 100 and 200, and a positive electrode of the light modulator 300, i.e., the control electrode for light modulation, is led out alone. The collector 400 and the gate 500 are also led out separately to form the collector 400 and the electric modulation electrode.

As mentioned above, in the present embodiment, the power device generally includes a plurality of integrated unit structures. When the specific structure and the operation of a single unit structure are known, after the fabrication process of the unit structure is completed, a plurality of unit structures can be arranged in an array according to power requirements to perform integration. An embodiment showing integration of unit structures is provided below.

Figure 4:
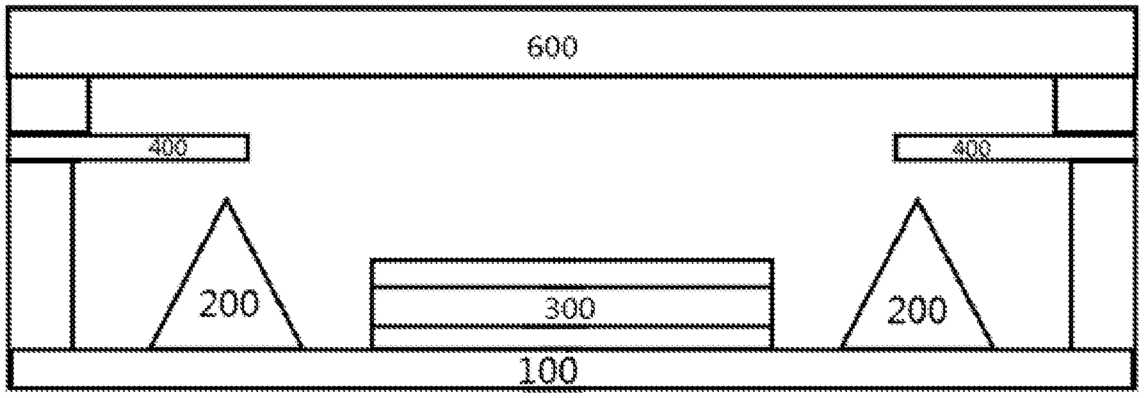
FIG. 4 is a schematic structural diagram of a power device according to an embodiment of the present disclosure.

Referring to FIG. 4, as an alternative embodiment, the power device includes at least two of the unit structures, and the two unit structures are integrated in a mirror-image form along the light modulator 300. Specifically, the two unit structures integrated in a mirror-image form along the light modulator 300 are provided with a bonding cover 600 thereon. In the structure of FIG. 4, the gate 500 is not formed, and the unit structure of FIG. 1 is taken directly for integration. Since the collector 400 after integration generates field emission electric field, and the light modulator 300 forms a photoelectric modulation electrode, the change of the collected electric current of the device is controlled by the light modulator. Further, the symmetrical structure is conducive to forming an array structure which is reproducible, so that a device with high power can be formed. Therefore, a plurality of unit structures can be integrated into arrays with reference to the integration mode of FIG. 4, thereby improving the power of the entire device.

The technical solutions in the embodiments of the present application have at least the following technical effects or advantages.

A vacuum packaged unit structure of a power device according to the embodiments of the present application comprises a silicon substrate 100; an emitter 200 formed on the silicon substrate 100 by a silicon-based process; a light modulator 300 formed on the silicon substrate 100 by a silicon-based process, the light modulator 300 being configured to generate photons so as to excite the emitter 200 to emit electrons; a collector 400 formed on the silicon substrate 100 by a silicon-based process, the collector 400 being configured to receive the electrons emitted by the emitter 200. On the one hand, the unified silicon-based process is compatible with the existing commercial process, so that it is easy for integration, simple for manufacture, and low in cost. On the other hand, the light modulator 300 formed on the silicon substrate 100 is introduced by a silicon-based process, which enhances field emission efficiency of the emitter 200, offsets the inconsistency of distances between the tips of the emitters 200 and the collector 400 caused by unevenness of the emitters 200, and increases the process redundancy of the cold cathode emitter, so that the device does not need to completely rely on the field emission principle to generate electrons, loads of field emission are reduced and the reliability of the device is further enhanced.

Figure 5:
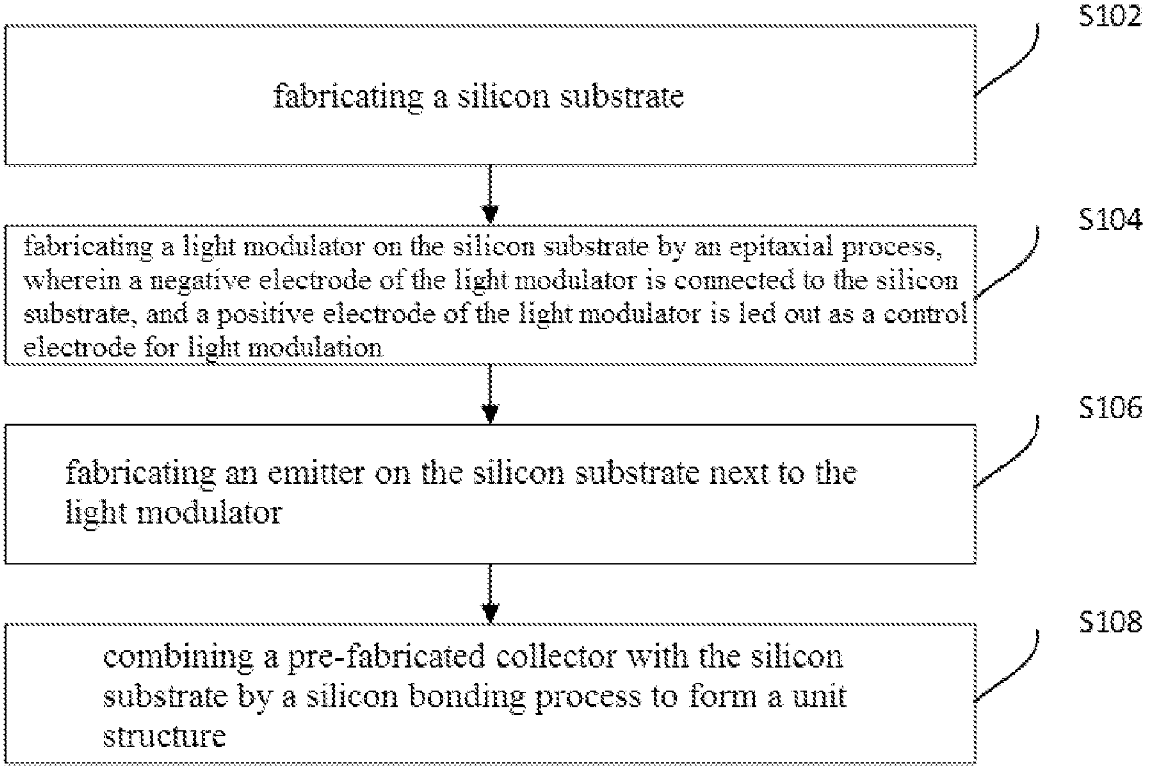
FIG. 5 is a flow chart of a method of fabricating a power device according to another embodiment of the present disclosure.

Referring to FIG. 5, a method of fabricating a power device according to another embodiment of the present disclosure is shown. The method is used to fabricate a unit structure mentioned above. The method may comprise:

S102, fabricating a silicon substrate;

S104, fabricating a light modulator on the silicon substrate by an epitaxial process, wherein a negative electrode of the light modulator is connected to the silicon substrate, and a positive electrode of the light modulator is led out as a control electrode for light modulation;

S106, fabricating an emitter on the silicon substrate next to the light modulator; and

S108, combining a pre-fabricated collector with the silicon substrate by a silicon bonding process to form a unit structure.

It should be noted that the implementation of the present embodiment can be made with reference to the foregoing embodiments, and the details are not described herein again.

Although the preferred embodiments of the present invention have been described, those skilled in the art can make other changes and modifications to those embodiments once they know the basic creative concept. Therefore, the appended claims are intended to be construed as covering preferred embodiments and all changes and modifications falling within the scope of the invention.

It is apparent that various modifications and variations can be made to the present invention by those skilled in the art without departing from the spirit and scope of the invention. Thus, the present invention also intends to cover those modifications and variations if they are within the scope of the claims and equivalents of the present invention.

The invention claimed is:

1. A power device comprising at least one vacuum packaged unit structure; wherein the unit structure comprises:
- a silicon substrate;
- an emitter formed on the silicon substrate by a silicon-based process;
- a light modulator formed on the silicon substrate by a silicon-based process, the light modulator being configured to generate photons so as to excite the emitter to emit electrons, wherein the light modulator is an ultraviolet LED structure emitting light transversely towards the emitter;
- a collector formed on the silicon substrate by a silicon-based process, the collector being configured to receive the electrons emitted by the emitter, wherein the unit structure is fabricated via:
- fabricating a silicon substrate;
- fabricating a light modulator on the silicon substrate by an epitaxial process, wherein a negative electrode of the light modulator is connected to the silicon substrate, and a positive electrode of the light modulator is led out as a control electrode for light modulation;
- fabricating an emitter on the silicon substrate next to the light modulator; and
- combining a pre-fabricated collector with the silicon substrate by a silicon bonding process to form a unit structure; and
- a gate formed on the silicon substrate, located between the collector and the emitter for generating an electric field to excite the emitter to emit electrons, wherein the gate improves the file emission modulation efficiency.

2. The power device according to claim 1, wherein the ultraviolet LED comprises an N-type semiconductor material, a P-type semiconductor material, and a resonant transversely formed by the N-type semiconductor material and the P-type semiconductor material.

3. The power device according to claim 2, wherein the N-type semiconductor material and the P-type semiconductor material are gallium nitride, indium gallium nitride or aluminum gallium nitride.

4. The power device according to claim 1, wherein the emitter comprises a silicon-based microtip structure and a metal layer covering the silicon-based microtip structure.

5. The power device according to claim 1, wherein a pressure in the vacuum package unit structure is 10−6 Pa~10 Pa.

6. The power device according to claim 1, wherein the power device comprises at least two vacuum packaged unit structures, and the two vacuum packaged unit structures are integrated in a mirror-image form along the light modulator.

7. The method of fabricating a power device according to claim 1, wherein the ultraviolet LED is configured to comprise an N-type semiconductor material, a P-type semiconductor material, and a resonant cavity formed by the N-type semiconductor material and the P-type semiconductor material.

8. The method of fabricating a power device according to claim 7, wherein the N-type semiconductor material and the P-type semiconductor material are gallium nitride, indium gallium nitride or aluminum gallium nitride.

9. The method of fabricating a power device according to claim 1, wherein the emitter is configured to comprise a silicon-based microtip structure and a metal layer covering the silicon-based microtip structure.

10. The method of fabricating a power device according to claim 1, wherein a pressure in the vacuum packaged unit structure is 10−6 Pa~10 Pa.

11. The method of fabricating a power device according to claim 1, wherein the power device is configured to comprise at least two unit structures, and the two unit structures are integrated in a mirror-image form along the light modulator.

12. The power device according to claim 1, wherein the light modulator excites the emitter to emit electrons by a photoelectric effect to supplement the electric field effect.

13. The power device according to claim 1, wherein the light modulator applies light modulation that results in an increase in a modulation frequency.

* * * * *